(12) United States Patent
Hussein et al.

(10) Patent No.: US 7,609,499 B2
(45) Date of Patent: Oct. 27, 2009

(54) ACTIVE CURRENT LIMITING CIRCUIT

(75) Inventors: Hakam D. Hussein, Eagan, MN (US); Wendong Zhang, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 527 days.

(21) Appl. No.: 11/122,960

(22) Filed: May 5, 2005

(65) Prior Publication Data

US 2006/0250738 A1    Nov. 9, 2006

(51) Int. Cl.
H02H 9/08    (2006.01)
(52) U.S. Cl. .................................................. 361/93.9
(58) Field of Classification Search ............... 361/93.1, 361/93.7, 93.9, 94
See application file for complete search history.

(56) References Cited

U.S. PATENT DOCUMENTS

| | | | | |
|---|---|---|---|---|
| 4,841,313 A * | 6/1989 | Weiner | ...................... | 347/128 |
| 4,943,762 A | 7/1990 | Campbell et al. | ............ | 323/284 |
| 4,999,728 A | 3/1991 | Curl | ............................ | 361/33 |
| 5,311,071 A * | 5/1994 | Ueda | ........................... | 327/63 |
| 5,519,264 A | 5/1996 | Heyden et al. | ............... | 307/125 |
| 5,559,660 A | 9/1996 | Watson et al. | .................. | 361/58 |
| 5,694,305 A | 12/1997 | King et al. | .................... | 363/21 |
| 5,861,737 A * | 1/1999 | Goerke et al. | ............... | 323/282 |
| 6,127,882 A * | 10/2000 | Vargha et al. | ............... | 327/540 |
| 6,181,030 B1* | 1/2001 | Carpenter et al. | ........... | 307/113 |
| 6,185,645 B1 | 2/2001 | Klein et al. | .................. | 710/103 |
| 6,225,797 B1 | 5/2001 | Willis et al. | .................. | 323/351 |
| 6,233,625 B1 | 5/2001 | Vander Kamp et al. | ....... | 710/10 |
| 6,262,493 B1 | 7/2001 | Garnett | ........................ | 307/64 |
| 6,333,643 B1 | 12/2001 | Kurooka et al. | ............... | 326/83 |
| 6,408,394 B1 | 6/2002 | Vander Kamp et al. | ..... | 713/300 |
| 6,525,515 B1 | 2/2003 | Ngo et al. | ................... | 323/277 |
| 6,535,944 B1 | 3/2003 | Johari et al. | ................. | 710/302 |
| 6,538,492 B2* | 3/2003 | Sano et al. | ................... | 327/530 |
| 6,643,087 B1 | 11/2003 | Kuroki et al. | ................. | 360/75 |
| 6,917,504 B2 | 7/2005 | Nguyen et al. | .............. | 361/100 |
| 6,949,961 B2 | 9/2005 | Robb et al. | .................... | 327/52 |
| 2002/0118501 A1* | 8/2002 | Ochi | ......................... | 361/93.9 |

(Continued)

OTHER PUBLICATIONS

Paul Horowitz and Winfield Hill, The Art of Electronics, Second Edition, pp. 239-232.*

(Continued)

Primary Examiner—Rexford N Barnie
Assistant Examiner—Nicholas Ieva
(74) Attorney, Agent, or Firm—Westman, Champlin & Kelly, P.A.; David D. Brush (57) ABSTRACT

A current controller for a device is provided. The current controller includes power and ground inputs for connecting to a source of energization, and power and ground outputs for connecting to the device. A variable impedance is coupled in series between the power input and the power output and has an impedance control input. The impedance control input controls the variable impedance between a high impedance, OFF state and a low impedance, ON state. An impedance control circuit is coupled to the impedance control input, which biases the variable impedance in the high impedance, OFF state when at least one of the following conditions occur: the resistance between the power and ground outputs is less than a threshold resistance, and current drawn by the current controller through the power input exceeds a threshold current level.

20 Claims, 7 Drawing Sheets

U.S. PATENT DOCUMENTS

2002/0196004 A1* 12/2002 Berson et al. ................ 323/282
2003/0056125 A1   3/2003 O'Conner et al. ........... 713/300
2004/0012263 A1   1/2004 Hussein et al. ................ 307/18
2004/0246642 A1* 12/2004 Ball .......................... 361/93.1
2006/0250738 A1  11/2006 Hussein et al. ............. 361/93.1

OTHER PUBLICATIONS

U.S. Appl. No. 10/824,866, filed Apr. 15, 2004.

* cited by examiner

ACTIVE CURRENT LIMITING CIRCUIT

CROSS-REFERENCE TO RELATED APPLICATION

Cross-reference is hereby made to U.S. application Ser. No. 10/824,866, filed Apr. 15, 2004, which is entitled INRUSH CURRENT CONTROLLER and is assigned to the same assignee.

FIELD OF THE INVENTION

The present invention relates generally to current limiting circuits for protecting electronic devices from being damaged under fault conditions, and more particularly but not limited to inrush current controllers for hot plugging devices into host systems.

BACKGROUND OF THE INVENTION

Various kinds of electrical systems have individual electronic devices that are connected to a common power supply or supply bus. An electrical fault condition in one of the devices can adversely effect or damage other devices in the system when the device is mated with the main power supply bus or is energized. For example, various kinds of computer systems are arranged to provide for physical insertion and removal of one or more disc drives while the computer system is energized and running. Some of these systems can contain hundreds or thousands of disc drives connected to the same power supply bus. When the disc drive power supply initially connects to the main power supply bus, there can be a current surge that adversely effects the operation of the computer system, the power supply, the disc drive that is being inserted or other disc drives in the system.

Various types of circuits are known to reduce these current surges. For example, inrush current controllers have been implemented within some electrical systems for limiting inrush current as an electrical device is being powered-up. Also, fast response fuses have been connected in series with the power supply for limiting current drawn by a particular device. However, even with a typical inrush current controller and a fast response fuse, certain electrical fault conditions in one device can cause momentary or sustained high current levels that can damage the device or other devices in the system.

Embodiments of the present inventions provide solutions to these and other problems, and offer other advantages over the prior art.

SUMMARY OF THE INVENTION

One embodiment of the present invention is directed to current controller for a device. The current controller includes power and ground inputs for connecting to a source of energization, and power and ground outputs for connecting to the device. A variable impedance is coupled in series between the power input and the power output and has an impedance control input. The impedance control input controls the variable impedance between a high impedance, OFF state and a low impedance, ON state. An impedance control circuit is coupled to the impedance control input, which biases the variable impedance in the high impedance, OFF state when at least one of the following conditions occur: the resistance between the power and ground outputs is less than a threshold resistance, and current drawn by the current controller through the power input exceeds a threshold current level.

Another embodiment of the present invention is directed to an inrush current controller for a device. The controller includes a host system interface having power and ground inputs and a power control logic input. The system further includes power and ground outputs for connecting to the device. A variable impedance is coupled between the power input and the power output and has an impedance control input, which controls the variable impedance between a high impedance, OFF state and a low impedance, ON state. An inrush current limit circuit is coupled to the power control logic input and provides an inrush limit output to the impedance control input. The inrush limit output biases the variable impedance between the ON and OFF states. A resistance sensor is coupled to the power output and senses a resistance between the power output and the ground output. The resistance sensor has a sensor output, which is coupled to the inrush current limit circuit and disables the inrush limit output to bias the variable impedance in the OFF state when the resistance is less than a threshold resistance. The sensor output enables the inrush limit output when the resistance exceeds the threshold resistance.

Another embodiment of the present invention is directed to an inrush current controller for a device. The controller includes a host system interface having power and ground inputs, for connecting to a source of energization, and a power control logic input. The system further includes power and ground outputs for connecting to the device. A variable impedance is coupled between the power input and the power output and has an impedance control input, which controls the variable impedance between a high impedance, OFF state and a low impedance, ON state. A timer is coupled to the power input and provides a timer output to the impedance control input, which forces the variable impedance into the OFF state during a first time interval after connecting to the source of energization. A current measurement circuit measures current drawn by the current controller through the power input and has an output coupled to the timer, which disables the timer output to bias the variable impedance in the OFF state when the current exceeds a threshold current level and which enables the timer output when the current is less than the threshold current level.

DETAILED DESCRIPTION OF ILLUSTRATIVE EMBODIMENTS

An embodiment of the present invention relates an active current limiting circuit for protecting electronic devices from being damaged from short circuit or low resistant failing conditions on a main power supply or supply bus. The active current limiting circuit can be used in conjunction with typical inrush current controllers, for example. The active current limiting circuit quickly detects a failing condition and disconnects the failing device from the main power supply bus. This allows any remaining devices that are connected to the main power supply bus to continue operation without disruption. The active current limiting circuit is particularly useful for hot-plugging devices into a common source of energization provided by a host system.

In one embodiment, the inrush current controller includes a variable impedance, which controls a flow of inrush current from a hot-plug connector to the device. The hot-plug connector includes power and ground inputs and a power control input, which controls the variable impedance through an impedance control circuit. The impedance control circuit forces the impedance to an OFF state during a first time interval after hot-plugging and triggers a limited inrush of current to the device after the first time interval, if the power control input is in an active state.

The impedance control circuit ensures that energization is not applied to the device while the hot-plug connector is in the process of being mated with the host system. The impedance control circuit also ensures that the energization of the device is controllable by the host system through the power control input. Energization of the device can be controlled by the host system to occur in a controlled, repeatable time and voltage sequence defined by the impedance control circuit.

The active current limiting circuit operates in conjunction with the inrush current controller to force the impedance to the OFF state (thereby disconnecting the device from the main power supply) under several conditions. The inrush current controller forces the impedance to the OFF state if the current drawn from the main power supply has reached a predetermined threshold during power up or normal operation. The inrush current controller also forces the impedance to the OFF state if the impedance from the power supply input of the device to ground is sensed to be less than a predetermined threshold during power up. In addition, the inrush current controller also forces the impedance to the OFF state if the power control signal received from the host system is commanded to an inactive state.

While an embodiment of the present invention is described below in the context of hot-plugging a data storage device into a host computer system, the present invention is useful in any hot plug or non-hot plug application and in any other type of memory or non-memory electrical system.

Figure 1:
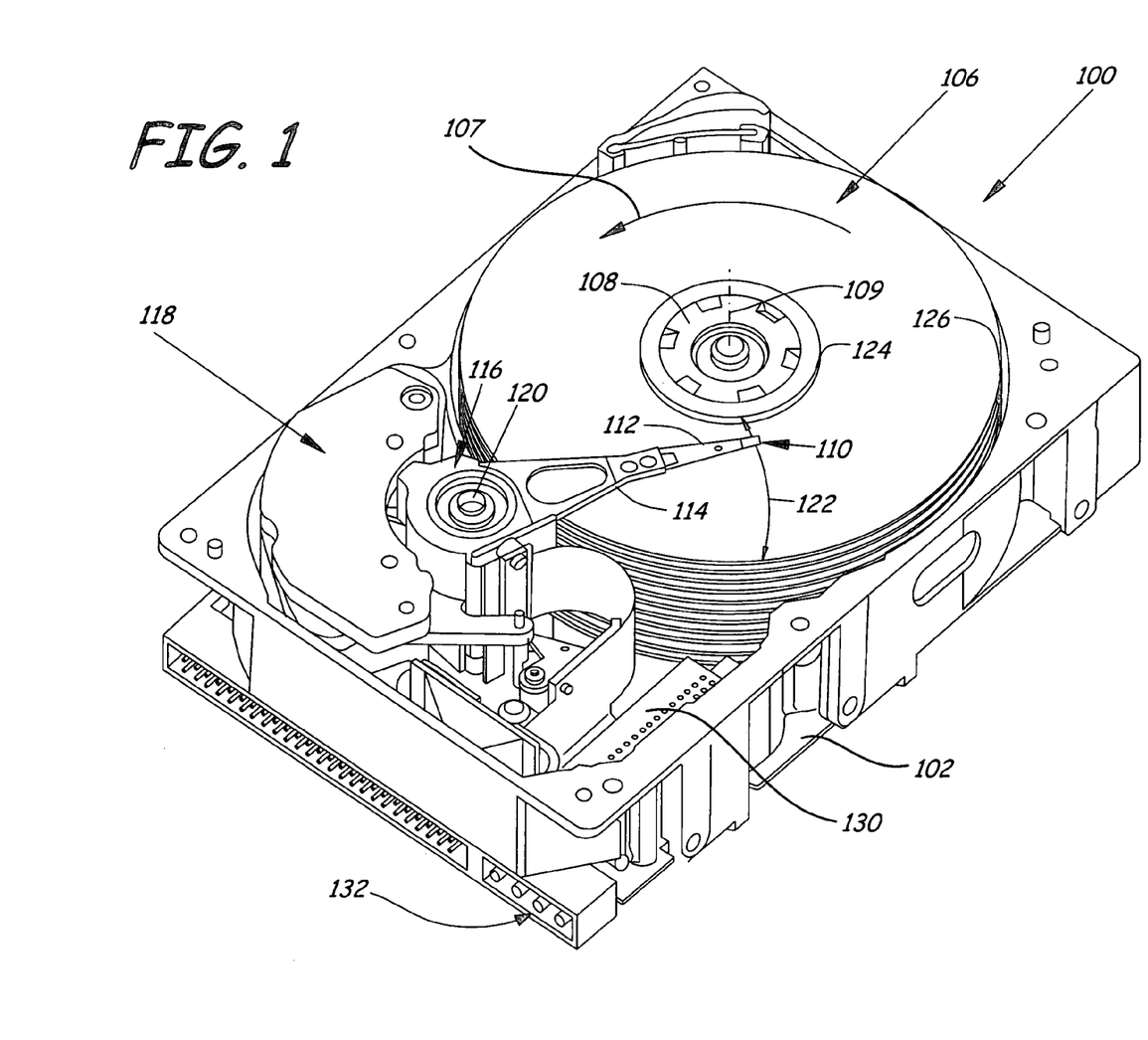
FIG. 1 is a perspective view of a data storage device in which an embodiment of the present invention is useful.

FIG. 1 is a perspective view of a disc drive 100 in which an embodiment of the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central access 109. Each disc surface has an associated disc head slider 100 which is mounted to disc drive 100 for communication with the disc surface. In the example shown in FIG. 1, sliders 100 are supported by suspensions 112, which are in turn attached to track accessing arms 114 of an actuator 116. The actuator shown in FIG. 1 is of the type known as a rotary moving coil actuator and includes a voice coil motor shown generally at 118. Voice coil motor 118 rotates actuator 116 with its attached heads 110 about a pivot shaft 120 to position heads 110 over a desired data track along a path 122 between a disc inner diameter 124 and a disc outer diameter 126. Voice coil motor 118 is driven by servo electronics 130 based on signals generated by heads 110 and a host computer system (not shown).

Disc drive 100 includes an electrical connector 132 that is arranged for hot-plugging the disc drive 100 into the host computer system. The term "hot-plugging" refers to adding or removing a device (such as drive 100) to or from a host system while the host system is energized or running. Hot-plugging a data storage device can be implemented across a range of host systems, including laptop, desktop and large main frame computers with multidisc drive bays as well as various types of embedded control systems. As described in more detail in connection with the following figures, disc drive 100 includes an inrush current controller for avoiding surges and spikes that can adversely effect the drive 100, the host system and/or other drive connected to the host system. Further, the controller is configured to disconnect drive 100 under short circuit or low impedance failing conditions.

Figure 2:
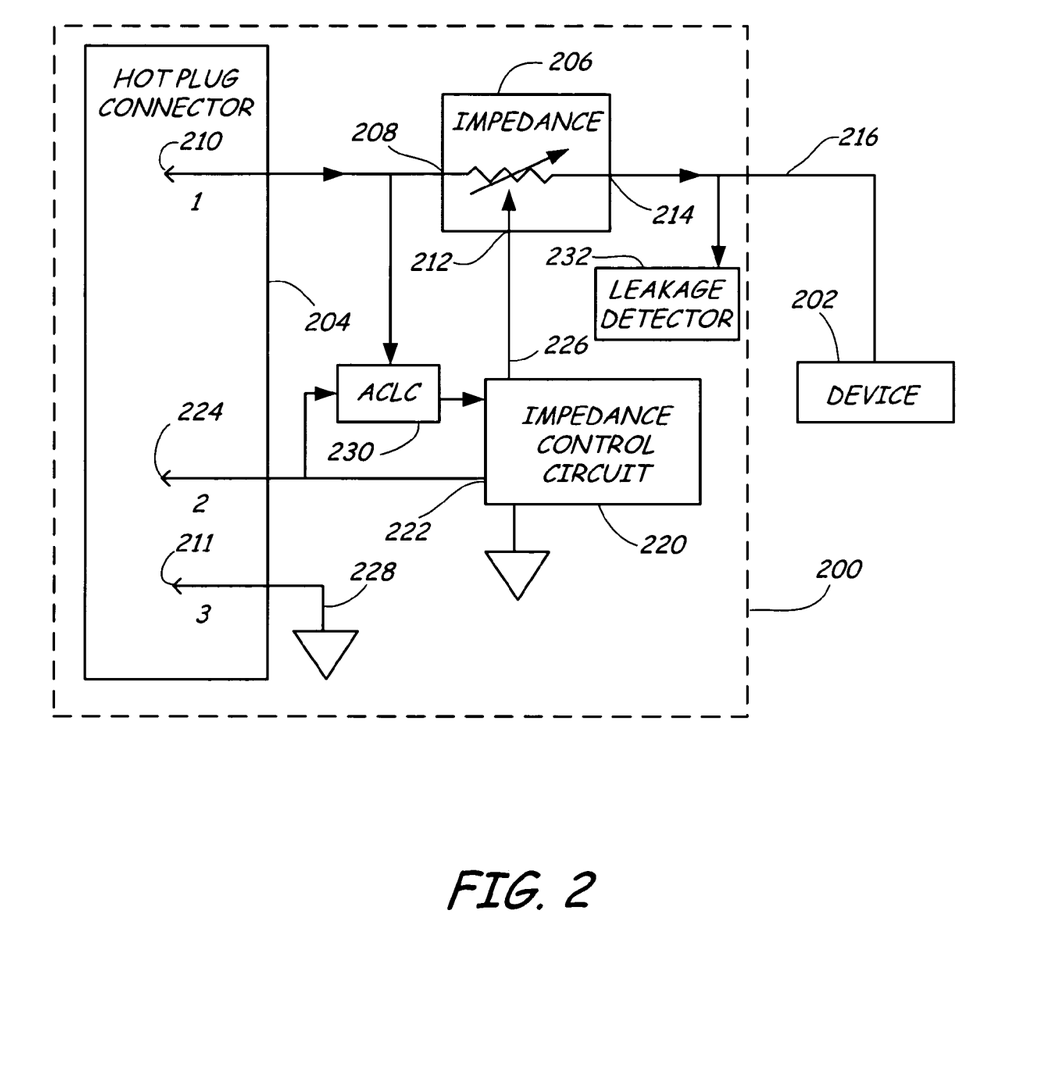
FIG. 2 is a block diagram of an inrush current controller according to one embodiment of the present invention.

FIG. 2 is a block diagram of an inrush current controller 200 according to one embodiment of the present invention. Inrush current controller 200 controls energization for a device 200, such as disc drive 100 shown in FIG. 1. Inrush current controller 200 includes a connector 204 (comparable to connector 132 in FIG. 1) for hot-plugging the device 202 into a source of energization (not illustrated), such as a main power supply bus. Connector 204 includes a power input 210, a ground input 211 and a power control logic input 224. The source of energization is typically a host computer system that is arranged for hot-plugging and includes respective power and ground contacts and a logic contact, which the host system uses to signal a start-up and a turn-off of the device 202.

Inrush current controller 200 includes a variable impedance 206 having a current input 208, and impedance control input 212 and a current output 214. Current input 208 is coupled to power input 210, and current output is coupled to power output 216. An electrical signal applied to impedance control input 212 controls the impedance between current input 208 and current output 214 and therefore the current delivered to device 202 through power output 216.

Inrush current controller 200 further includes an impedance control circuit 220 having a logic input 222 and an impedance control output 226. Logic input 222 is coupled to power control logic input 224 of connector 204, and impedance control output 226 is connected to impedance control input 212 of impedance 206. The impedance control output 226 forces the impedance 206 between ON (low impedance) and OFF (high impedance) states. In one embodiment, impedance control circuits 220 forces impedance 206 into the OFF state to generate an effectively open circuit during a first time interval immediately after hot-plugging. The power control signal received on logic input 222 triggers a limited inrush of current through impedance 206 after the first time interval. Ground input 211 is coupled to a common ground conductor 228, which provides a return path to a common ground bus in the host system for energization current delivered to inrush current controller 200 and device 202.

Impedance control circuit 220 ensures that energization is not applied to device 202 while hot-plug connector 204 is in the process of being mated with the host system. The impedance control circuit 220 also ensures that the energization of device 202 is controllable (if desired) by the host system through power control input 224. Energization of device 202 can be controlled by the host system to occur in a controlled, repeatable time and voltage sequence defined by impedance control circuit 220.

Inrush current control circuit 200 further includes an active current limiting circuit 230 and a leakage detector 232. Active current limiting circuit 230 is coupled to power input 210 for measuring the level of current drawn by inrush current controller 200 and device 202 from power input 210. If the current level drawn through power input 210 exceeds a predetermined threshold, such as 5 Amps, active current limiting circuit 230 turns off impedance 206 through control circuit 220, thereby disconnecting device 202 from power supply input 210. Leakage detector 232 is coupled to power output 216 for measuring the impedance of device 202 between power output 216 and the common ground conductor 228. Leakage detector 232 turns off impedance 206 if the sensed impedance between power output 216 and ground conductor (or ground output) 208 drops below a predetermined threshold.

Figure 3:
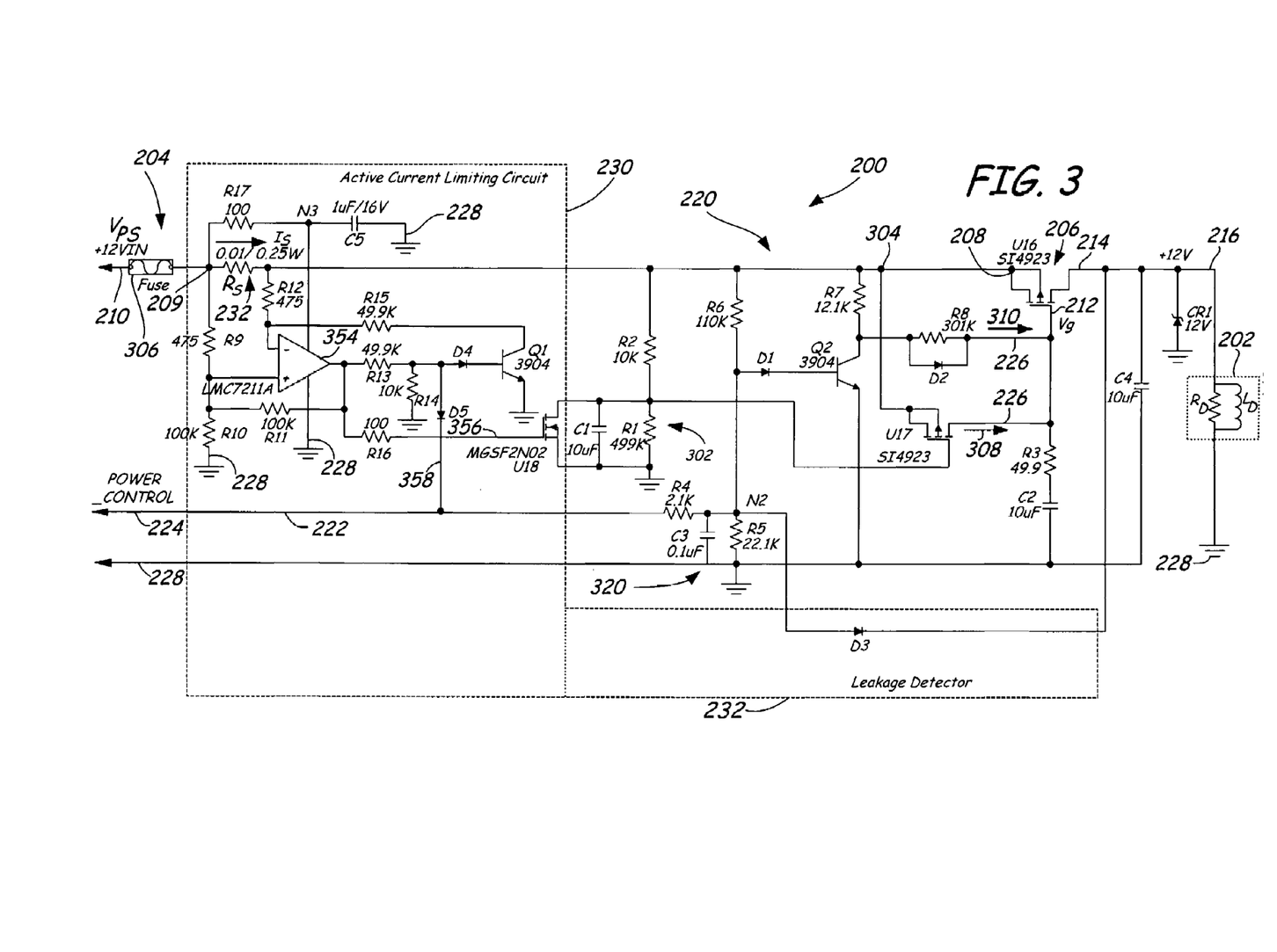
FIG. 3 is a schematic diagram illustrating the inrush current controller in greater detail according to one embodiment of the present invention.

FIG. 3 is a schematic diagram illustrating inrush current controller 200 in greater detail according to one embodiment of the present invention. The same reference numerals are used in FIG. 3 as where used in FIG. 2 for the same or similar elements. Although FIG. 3 illustrates particular circuit arrangements, component values and types, it should be understood that these elements are provided as examples only and can be modified as desired for different applications. Also, the arrangements can be modified to use positive or negative supply voltages.

In the example shown in FIG. 3, variable impedance 206 includes a transistor U16, which is an enhancement mode P-channel MOSFET such as type SI4923. Transistor U16 has a gate that forms impedance control input 212, a source that forms current input 208 and a drain that forms current output 214. Other types of transistors or variable impedance can be used as well with appropriate changes to polarity and signal levels. In this example, a MOSFET works well since it has an insulated gate which does not load impedance control output 226. Also, the use of a PMOS enhancement mode device reduces the need for complex bias circuitry to ensure that the device forms an open circuit when hot plug connector 204 is initially plugged in.

Impedance control circuit 220 includes a timer 302 formed by capacitor C1, resistors R1 and R2 and transistor U17. Resistors R1, R2 and capacitor C1 form a resistance-capacitance (RC) circuit that controls the gate of transistor U17. Transistor U17 is connected between power input node 304 and the gate of transistor U16. In one embodiment, transistor U17 is a P-channel MOSFET transistor, such as a type SI4923.

Assuming no fault conditions exist, when hot-plug connector 204 is plugged into a host system that provides energization, power received on power input 210 is coupled to node 304 through fuse 306 and resistor $R_S$. In one embodiment, the host system provides an input voltage of 12 Volts DC. Other input voltages can also be used. Capacitor C1 is initially discharged and charges to about 12 Volts through resistor R2 with an RC time constant that is on the order of 100 milliseconds, for example.

Since capacitor C1 is initially discharged when hot-plug connector 204 is plugged into the power supply bus (not shown), the bias voltage applied to the gate of transistor U17 is initially at ground or zero volts, while the voltage applied to the source of transistor U17 is the positive supply voltage, such as +12 volts. The bias voltage at the gate of transistor U17 is negative relative to the source, and the P-channel transistor U17 conducts a current pulse represented by arrow 308 (also called a timer output 308) to impedance control input 212. The current pulse pulls the gate of transistor U16 high, turning off transistor U16 and charging capacitor C2.

As capacitor C1 in timer 302 charges, the voltage at the gate of transistor U17 rises to near a voltage on the source of transistor U17. Transistor U17 shuts off and stops conducting. The gate of transistor U17 is an insulted gate and does not drain current from capacitor C1.

The current pulse 308 has a pulse width (at the start of the first time interval) that is a predetermined value, such as about 20 milliseconds. The current pulse charges capacitor C2 through resistor R3. Capacitor C2 and resistor R3 have a desired RC time constant, such as about 0.5 milliseconds. Capacitor C2 is thus fully charged at the end of the first time interval of about 20 milliseconds. Timer output 308 overrides an inrush current limit output 310 (described in more detail below) during the first time interval.

During the first time interval, impedance 206 (transistor U16) is switched off by timer output 308 regardless of the state of the inrush current limit output 310. After the first time interval, transistor U17 is effectively an open circuit, an impedance 206 is controlled by the inrush current limit output 310, which can only slowly discharge capacitor C2. This arrangement protects the host system and the device 202 (shown in FIG. 2) from high and rush currents when connector 204 is initially plugged in and also allows for the host system to control the timing of the application of energization to device 202. It will be understood by those skilled in the art that the time intervals and the slew rates mentioned herein are exemplary, and other time intervals and slew rates, can be used depending on the needs of the application, by adjusting RC time constants.

When hot-plug connector 204 is unplugged from the main power supply bus, charge stored on capacitor C1 discharges through resistor R1. This discharge through resistor R1 automatically resets timer circuit 302 when the connector is disconnected from the source of energization.

Impedance control circuit 220 further includes an inrush trigger circuit 320, which biases inrush current limit output 310. Inrush trigger circuit 320 includes resistors R4-R8, capacitor C3, diodes D1 and D2, and transistor Q2. In one embodiment, transistor Q2 is a type 2N3904. Resistors R4, R5, R6, capacitor C3 and diode D1 form an input bias network for biasing the base of transistor Q2. When power control input 224 is left open circuited (not connected to an external circuit), then current flows from power input 210 through resistors R5 and R6 and diode D1 to charge capacitor C3 and provide a bias current to the base of transistor Q2, which turns transistor Q2 on. When transistor Q2 is on, transistor Q2 pulls the gate of transistor U16 low through resistor R8 by discharging C2 via R3 and R8, thereby enabling U16 to conduct current after the first time period controlled by timer 302.

When power control input 224 is driven to a logic high state, then current flows from power control input 224 through resistor R4 and diode D1 to charge capacitor C3 and provide a bias current to the base of transistor Q2, which turns transistor Q2 on. When power control input 224 is driven to a logic low state, the charge on capacitor C3 discharges through R4 and R5, thereby turning off transistor Q2. When transistor Q2 is off and connector 204 is plugged into a power source, current flows from power input 210 through resistor R7 and diode D2, thereby pulling impedance control output 226 high. Current through resistor R7 and diode D2 charges capacitor C2 and maintains a high level voltage at impedance control input 212, which keeps transistor U16 (impedance 206) turned off. In one embodiment, the charging of capacitor C2 by the inrush current limit output 310 has an RC time constant about 0.1 second so that the logic level on power control input 244 is able to shut off impedance 206 in a controlled manner.

When transistor Q2 is on (corresponding to an open or high logic level on input 224), the collector of transistor Q2 is at a common, logic low voltage, and capacitor C2 discharges through resistors R3 and R8 and transistor Q2. Diode D2 is reverse biased and does not conduct. Capacitor C2 discharges with a time constant of about 3.5 seconds, for example. The large discharge time constant allows impedance control input 212 to pass very slowly through a threshold turn-on voltage for impedance 206. In one embodiment, impedance 206 is continuously variable over a range near its gate threshold and turns on slowly and limits an inrush current between power input 210 and power output 216. The device voltage between power output node 216 and ground node 228 preferably rises to its full value over a further time interval, which can be about 100 milliseconds, for example. For a 12-volt energization level, this limits the slew rate to a preselected time limit, for example, of about 12 volts per 100 milliseconds or less. The slew rate is controlled by the values of capacitor C2, resistors R3 and R8, and the characteristics of impedance 206.

Power control input 244 triggers the limited inrush current when the logic input is either an open circuit or at a high logic level. When the logic input is at a low logic level, impedance control circuit 220 shuts off energization to device 202 in a controlled manner. The host system is therefore able to actuate power control input 244 to control energization turn-on and turn-off. If power control input 244 is not available to the host system or is inadvertently disconnected, then impedance control circuit 220 automatically energizes device 202 after the first time interval.

As described above, active current limiting circuit 230 and leakage detector 232 operate in conjunction with impedance control circuit 220 to disconnect device 202 from power input 210 under certain sensed failure conditions.

Leakage detector 232 senses the impedance/resistance of device 202 between power output 216 and ground conductor 228. Device 202 has a device resistance $R_D$ between power output 216 and ground conductor 228 and may include an inductive component $L_D$, which presents a partially inductive impedance. A Zener diode CR1 provides clamping for over voltage protection, but is inactive under normal operating conditions. Capacitor C4 is coupled between power output 216 and ground conductor 228 for providing a filtered output voltage.

Leakage detector 232 includes a diode D3, which has an anode connected to variable impedance trigger node N2 and a cathode connected to power output 216. As described above, when hot-plug connector 204 is connected to the main power bus and power control input 244 is open-circuited or driven to a logic high state, capacitor C3 charges trigger node N2 past the turn-on voltage of diode D1 and transistor Q2, turning on transistor Q2 and thereby pulling the gate of transistor U16 low. This turns on transistor U16 allowing device 202 to be energized after the first time interval determined by timer circuit 302.

During power-up, if the resistance $R_D$ Of device 202 is less than a predetermined threshold such as 22 K Ohms, then diode D3 becomes forward biased and clamps the voltage on node N2 to approximately 1 Volt. This voltage is insufficient to turn on transistor Q2. With transistor Q2 off, resistors R7 and R8 hold the gate of transistor U16 high. Therefore, even after the first time interval, transistor U16 remains off keeping the power disconnected from device 202. Diode D3 will not respond to a low impedance condition occurring after the first time interval since impedance 206 will be ON and keep diode D3 reverse biased.

With leakage detector 232, a short circuit or low impedance condition within device 202 during power-up will not adversely affect the host system or other electronic devices connected to the same power bus. In some embodiments, many electronic devices can be connected to the same power bus such that a failure in one device can otherwise bring the whole power bus down and adversely effect the operation of all devices connected to that bus. For example, some large data storage systems can include hundreds or thousands of individual disc drives that can be connected to the same power supply bus. Each disc drive can be connected to or disconnected from the main power supply bus while the bus is energized and the other disc drives are powered-up and operating. If a faulty disc drive having a low impedance is hot-plugged into the main power supply bus, the faulty device can cause a current surge on the main power supply bus that can adversely effect the other disc drives or bring down the entire bus. With the impedance measurement circuit shown in FIG. 3, a short circuit or low impedance state in a device 202 will prevent impedance 206 from turning on, which effectively prevents the device from being connected to the main power supply bus. The faulty device can then be removed and then replaced or repaired without effecting the other devices on the bus.

Similarly, active current limiting circuit 230 measures the level of current drawn by inrush current controller 200 and device 202 through sense resistor $R_S$. If the current drawn through sense resistor $R_S$ exceeds a predetermined threshold current level, such as 5 amps, during power-up or normal operation, active current limiting circuit 230 turns off variable impedance 206, thereby disconnecting device 202 from the main power supply bus.

Active current limiting circuit 230 includes sense resistor $R_S$, comparator 354, transistor Q1, resistors R9-R17, capacitor C5, diodes D4 and D5 and transistor U18. In one embodiment, comparator 354 is a type LMC7211A comparator, transistor Q1 is a type 2N3904 and transistor U18 is a N-channel MOSFET transistor of type MGSF2N02, for example. Comparator 354 is biased between node N3 and ground conductor 228. Resistor R17 and capacitor C5 are coupled in series between power input node 209 and ground node 228 to form a low pass filter for the voltage on N3. Sense resistor $R_S$, resistors R9-R16, diodes D4 and D5, comparator 354 and transistor Q1 together form a latch having a latch output 356 and a reset input 358.

Sense resistor $R_S$, input resistors R9, R10 and R12, and feedback resistors R11 and R15 set the bias conditions for the inverting and non-inverting inputs of comparator 354. The current $I_S$ through sense transistor $R_S$ generates a sense voltage $V_{RS}$, which is compared to a reference voltage developed across input resistor R9 due to the voltage $V_{PS}$ applied to power input 210. The voltage drop across R9 is determined by the relative resistances of the voltage divider formed by R9 and R10. Assuming the input offset voltage, $V_{off}$ of comparator 354 is zero, The equal sign after RSIs should be leveled with the quotient bar, not in the denominator.

$$V_{RS} = R_s I_S \frac{R9}{R9 + (R10 \parallel R11)} V_{PS}$$

The trip point of comparator 354 is when the voltage drop $V_{RS}$ is greater than the voltage drop $V_{R9}$ across resistor R9. Thus, the maximum current draw $I_{LIM}$ through sense resistor $R_S$ before the comparator will trip is, $$I_{LIM} = \frac{R9}{R9 + (R10 \| R11)} * \frac{V_{PS}}{R_S}$$

As mentioned above, in one embodiment the trip point $I_{LIM}$ is set to 5 Amps. If the sensed current $I_S$ is greater than $I_{LIM}$, then $V_{RS}$ will be greater than $V_{R9}$ and the inverting input of comparator 354 will therefore have a voltage that is less than the voltage on the non-inverting input. The output of comparator 354 will go high to $V_{ps}$ (e.g., 12 volts). The high voltage at the output of comparator 354 forward biases diode D4 and turns on transistor Q1. The collector of transistor Q1 is pulled low, providing positive feedback through resistor R15, which reinforces the low voltage on the inverting input of comparator 354. Also, resistor R11 provides another positive feedback path so that the high voltage on the output of comparator 354 reinforces the high voltage on the non-inverting input of comparator 354. These two positive feedback paths provide the latching function mentioned above.

With the output of comparator 354 latched in a logic high state, latch output 356 also goes high through resistor R16. The high voltage on latch output 356 turns on N-channel transistor U18, thereby discharging capacitor C1 and turning on transistor U17. Transistor U17 conducts current and pulls the gate of transistor U16 high toward $V_{PS}$, thereby turning off transistor U16 and disconnecting device 202 from the main power supply bus. Thus, if the current drawn through sense resistor RS exceeds $I_{LIM}$, active current limiting circuit 230 disconnects device 202 from the main power supply bus.

The host system can reset the latch in active current limiting circuit 230 by pulsing power control input 244 (and thus reset input 358) low. When reset input 358 goes low, diode D5 becomes forward biased, thereby turning off transistor Q1 and breaking the feedback path through resistor R15. If the power on the main power supply bus is energized and if there are no shorts in device 202 or other low impedance conditions that would draw excessive current, the voltage on the inverting input to comparator 354 rises above the voltage on the non-inverting input, causing the comparator output to go low. This pulls latch output 356 low, thereby turning off N-channel transistor U18. Capacitor C1 in timer circuit 302 can then begin to re-charge and restart the first time interval for turning on impedance 206 (transistor U16). When power control input 244 returns to the logic high level at the end of the reset pulse, inrush trigger circuit 320 turns on transistor Q2, thereby enabling the inrush current controller to switch the power on through transistor U16 once timer 302 times out (turning off transistor U17 and discharging capacitor C2).

Figure 4:
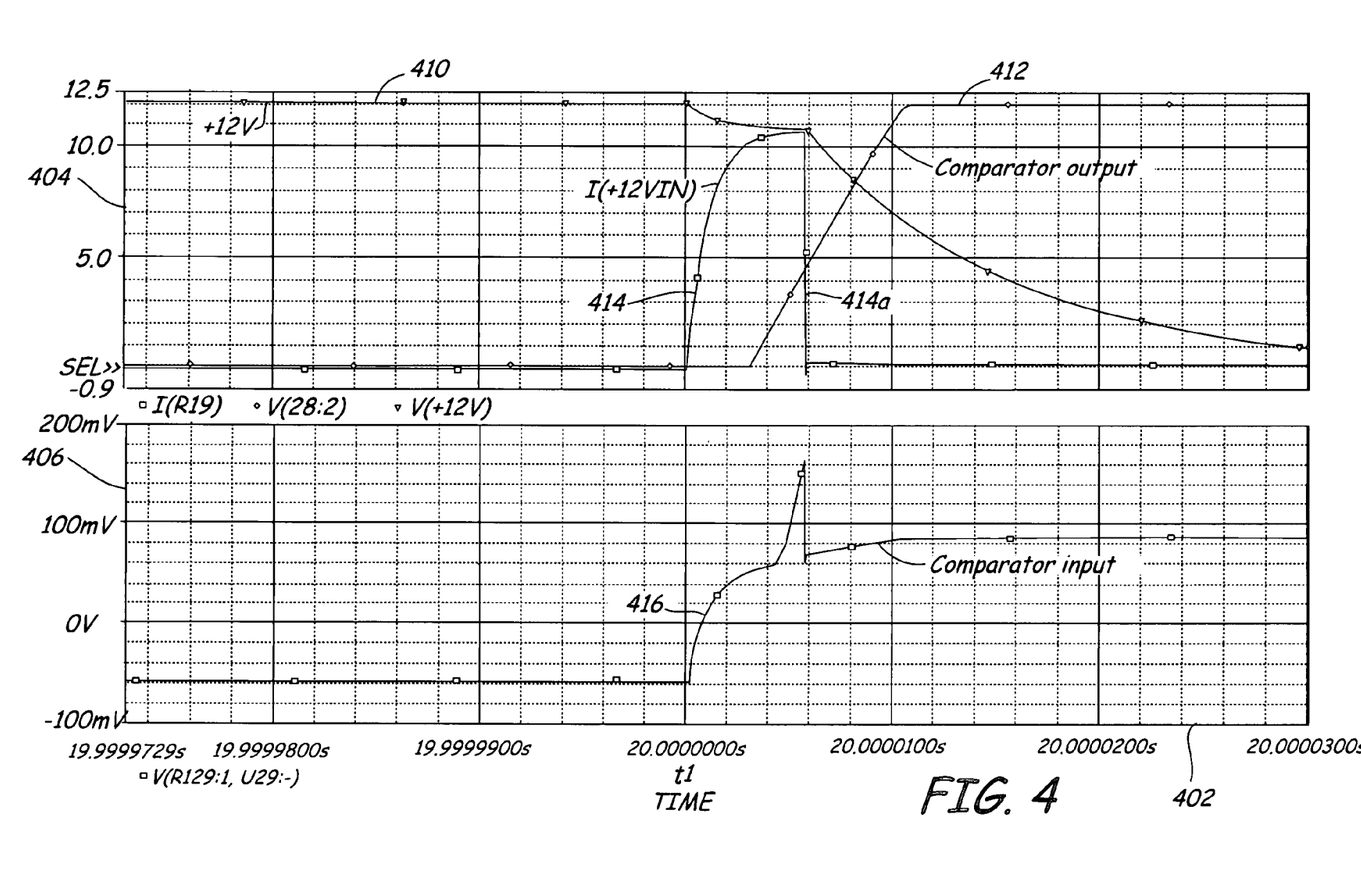
FIG. 4 is a timing diagram, which illustrates computer simulation results of a short circuit condition using the inrush current controller shown in FIG. 3.

FIG. 4 is a timing diagram, which illustrates computer simulation results of a short circuit condition using the inrush current controller shown in FIG. 3. The timing diagram has a horizontal axis 402, which represents time in seconds. A first vertical axis 404 represents various potentials in volts, and a second vertical axis 406 also represents potentials in volts. Waveform 410 represents the voltage at power output 216 to the device. Waveform 412 represents the voltage at the output of comparator 354. Waveform 414 is superimposed on waveform 410 and 412 and represents the current drawn through sense resistor $R_S$.

At time t1, a short circuit occurs, and the current through $R_S$ represented by waveform 414 begins to rise. Once the sensed current reaches the threshold level, the comparator output switches from a low voltage level to a high voltage level, as shown by waveform 412. As the comparator output 412 rises, the impedance 206 in inrush current controller 200 turns off, such that the current draw represented by waveform 414 drops back to zero, as represented by waveform section 414a. The output voltage 410 at the device input then depletes to zero.

Waveform 416 represents the differential voltage input to the comparator. Prior to the short condition at time instant t1, the differential voltage is slightly negative. Once the short condition occurs, the differential voltage 416 becomes positive, thereby tripping the comparator output, shown by waveform 412.

Figure 5:
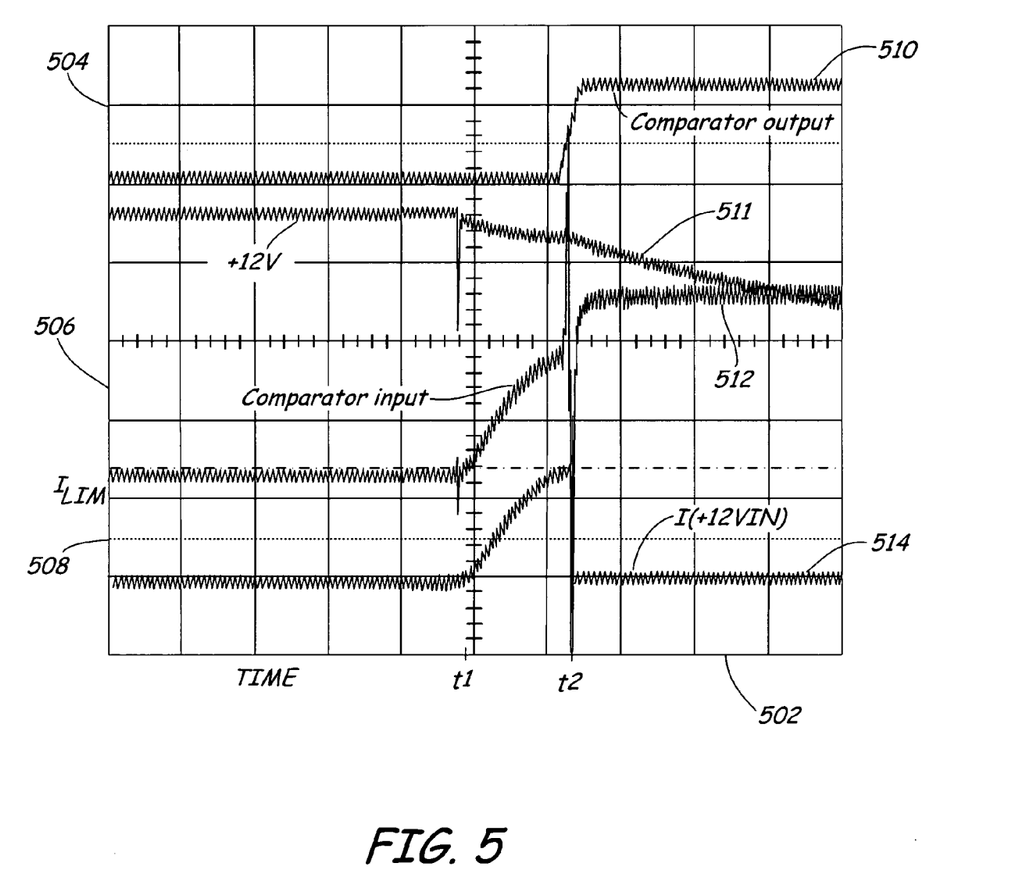
FIG. 5 is a waveform diagram illustrating an oscilloscope measurement of a short condition of a device under test.

FIG. 5 is a waveform diagram illustrating an oscilloscope measurement of a short condition of a device under test. The waveform diagram has a horizontal axis 502, which represents time in seconds. A first vertical axis 504 and a second vertical axis 506 represent various potentials in volts. A third vertical axis 508 represents current in Amps. Waveform 510 represents the comparator output voltage. Waveform 511 represents the power output to the device. Waveform 512 represents the differential voltage input to the comparator. Waveform 514 represents the current drawn through sense resistor $R_S$.

At time t1, a short circuit condition occurs, and the current drawn through resistor $R_S$ rises, causing the differential voltage at the input of the comparator to rise and become positive. Once the current level reaches the threshold $I_{LIM}$ the comparator trips causing the comparator output 510 to go high, thereby turning off the controlled impedance at time t2.

Figure 6:
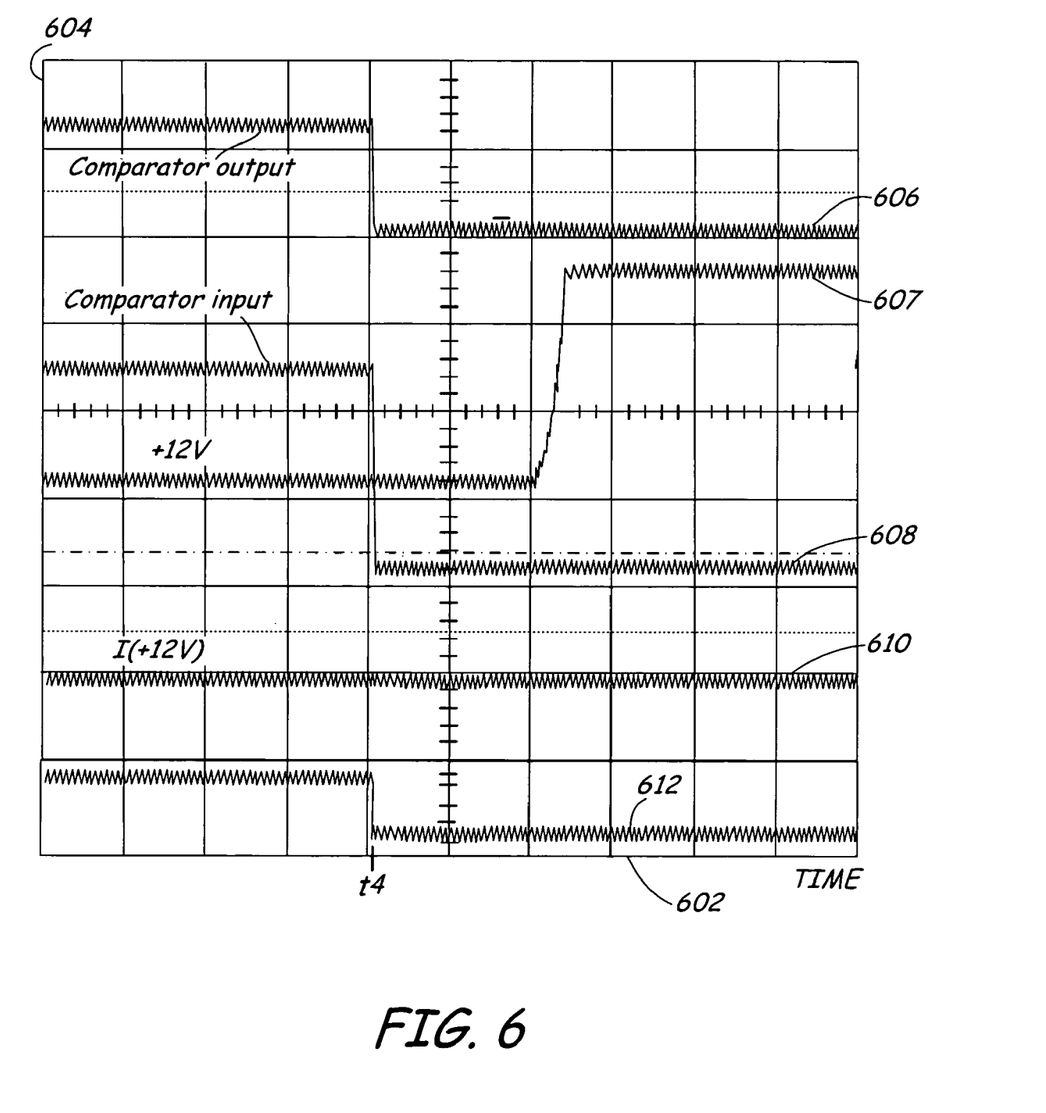
FIG. 6 is a waveform diagram illustrating an oscilloscope measurement of a re-start condition of a device under test.

FIG. 6 is a waveform diagram illustrating an oscilloscope measurement of a re-start condition of a device under test. The waveform diagram has a horizontal axis 602, which represents time, and a vertical axis 604 upon which various waveforms have been superimposed with one another. Waveform 606 represents the comparator output in volts. Waveform 607 represents the power output to the device. Waveform 608 represents the differential comparator input in volts. Waveform 610 represents the current drawn through sense resistor $R_S$ in Amps. Waveform 612 represents the power control signal received from the host computer on input 244 (shown in FIG. 3).

After the comparator has tripped, the comparator output 606 is high, the differential input voltage to the comparator is positive and the current drawn through the sense resistor has dropped to zero. When the power control input 612 is pulled low, at time t4, the comparator output 606 goes low and the differential comparator input 608 goes back to its normal, slightly negative state. The current draw 610 remains at zero until the end of the time delay of the timer.

Figure 7:
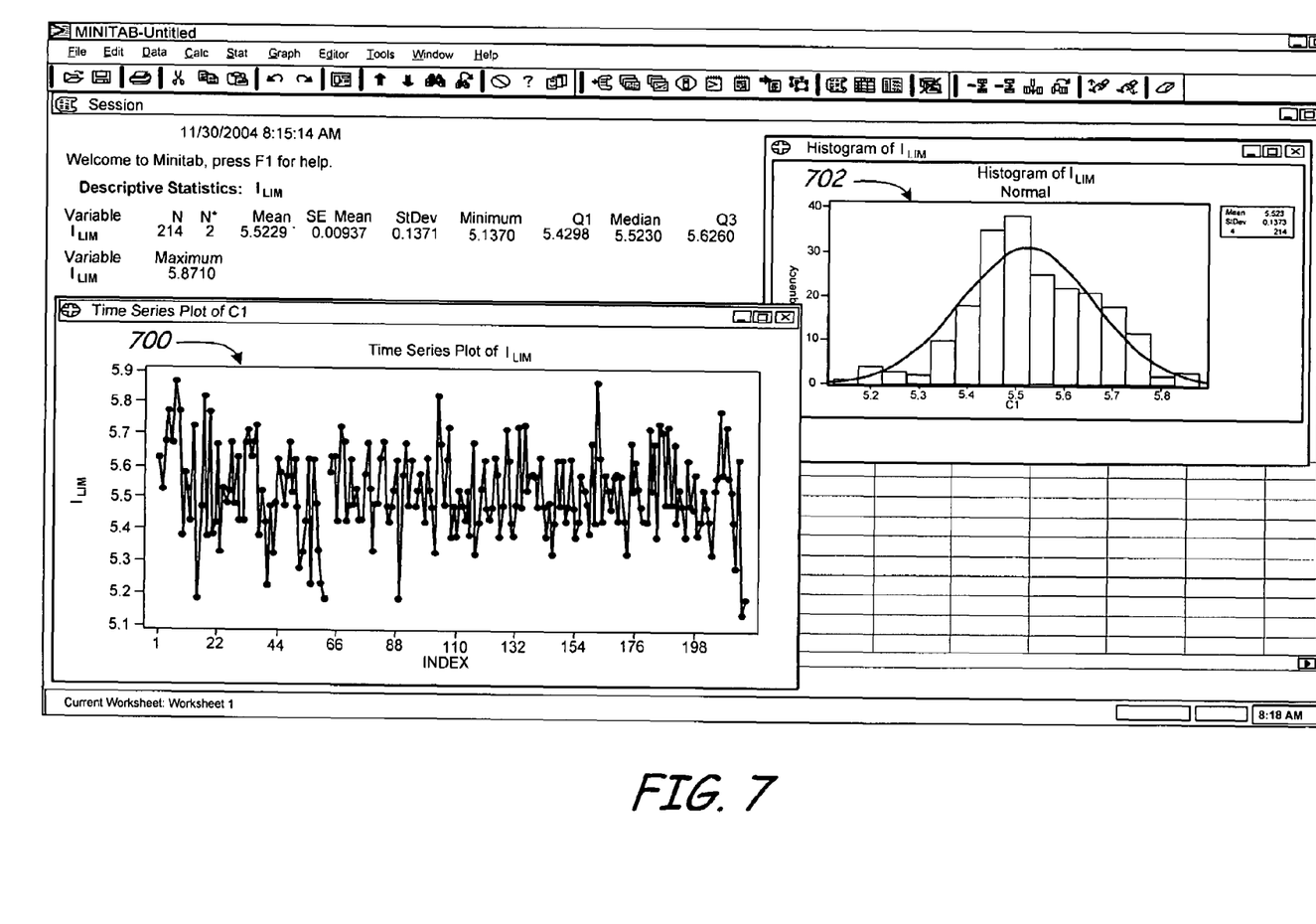
FIG. 7 is a diagram illustrating the active current limiting circuit current trip points derived from large sample size measurements.

FIG. 7 is a diagram illustrating the active current limiting circuit current trip points derived from large sample size measurements. Graph 700 represents a time series plot of the measured threshold current level $I_{LIM}$ over a large number of different current limiting circuits. The current limit is plotted on the vertical axis, and the index of circuit identifiers is plotted along the horizontal axis. In this set of tests, the current limit $I_{LIM}$ had a minimum of 5.37 amps, a maximum of 5.8712 amps and a mean of 5.522 amps, with a standard deviation of 0.1371 amps.

Graph 702 is a histogram, which plots frequency on the vertical axis and current limit on the horizontal axis. The mean current limit is about 5.5 amps, thus illustrating that the active current limit circuit provides a fairly accurate trip point.

The active current circuit limit described above therefore senses current accurately. The circuit also is relatively noise immune and has a latch function that prevents multiple tripping. As shown in FIG. 4, the response time of the comparator to a short circuit condition is very fast, on the order of 5 microseconds. This is much faster than the protection that would be provided by the in-line fuse 306 (shown in FIG. 3).

Although the present invention has been described with reference to preferred embodiments, workers skilled in the art will recognize that changes may be made in form and detail without departing from the spirit and scope of the invention.

What is claimed is:

1. A current controller for a device, comprising:
    an input connector comprising a power control logic input and power and ground inputs for connecting to a source of energization, and;
    power and ground outputs for connecting to the device;
    a variable impedance coupled in series between the power input and the power output and having an impedance control input, which controls the variable impedance between a high impedance OFF state and a low impedance ON state; and
    an impedance control circuit, which is coupled to the impedance control input and comprises:
        a current measurement circuit comprising a latch, which biases the impedance control input such that the variable impedance is in the OFF state when current drawn by the current controller through the power input exceeds a threshold current level, wherein the latch comprises a reset input, which is connected to the power control logic input of the input connector and is adapted to reset the latch.

2. The current controller of claim 1 wherein the impedance control circuit further comprises:
    a resistance sensor, which is coupled to the power output and senses a resistance between the power output and the ground output, wherein the resistance sensor biases the impedance control input such that the variable impedance is in the OFF state when the resistance is less than a threshold resistance.

3. The current controller of claim 2 wherein the resistance sensor comprises:
    a resistance sensor diode comprising an anode coupled to an impedance trigger node in the impedance control circuit and a cathode coupled to the power output for sensing the resistance between the power and ground outputs, wherein the resistance sensor diode biases the impedance control input through the impedance control circuit.

4. The current controller of claim 3 wherein the current controller has a power-up phase for a first time period following connecting to the source of energization and a normal operating phase following the first time period, and wherein the resistance sensor diode biases the impedance control input such that the variable impedance remains in the OFF state after the power-up phase if the resistance between the power and ground outputs during the power-up phase is less than the threshold resistance, and wherein the resistance sensor diode has substantially no effect on biasing the impedance control input if the resistance between the power and ground outputs exceeds the threshold resistance or if the resistance drops below the threshold resistance when the variable impedance is in the ON state during the normal operating phase.

5. The current controller of claim 1 wherein the current measurement circuit comprises:
    a sense resistance coupled in series between the power input and the variable impedance;
    a reference circuit biased by the power input; and
    a comparator, which compares a voltage drop across the sense resistance to a voltage drop across the reference circuit, wherein the comparator comprises positive feedback, which forms the latch having a latch output, wherein the latch output biases the impedance control input.

6. The current controller of claim 5 wherein the latch output biases the impedance control input such that the variable impedance is in the OFF state when the current drawn by the current controller through the sense resistance exceeds the threshold current level, and wherein the latch output has substantially no effect on biasing the impedance control input when the current drawn by the current controller through the power input is less than the threshold current level.

7. The current controller of claim 1 wherein the current controller comprises an inrush current controller, which further comprises:
    a connector for hot-plugging the device into the source of energization, the connector comprising the power and ground inputs and a power control logic input, wherein the impedance control circuit comprises an impedance control logic input coupled to the power control logic input.

8. The current controller of claim 7 wherein the impedance control circuit comprises:
    a timer coupled to the power input and providing a timer output to the impedance control input, which forces the variable impedance into the OFF state during a first time interval after hot-plugging; and
    an inrush current limit circuit coupled to the power control logic input and providing an inrush limit output to the impedance control input enabling a limited inrush of current through the variable impedance after the first time interval.

9. The current controller of claim 8 wherein the impedance control circuit further comprises:
    a resistance sensor diode comprising an anode coupled to the inrush current limit circuit and a cathode coupled to the power output, wherein the resistance sensor diode disables the inrush limit output to bias the variable impedance in the OFF state when the resistance between the power and ground outputs is less than the threshold resistance, and wherein the resistance sensor diode enables the inrush limit output when the resistance between the power and ground outputs exceeds the threshold resistance.

10. The current controller of claim 8 wherein the current measurement circuit measures the current drawn by the current controller and has an output coupled to the timer, which disables the timer output to bias the variable impedance into the OFF state when the current drawn by the current controller exceeds the threshold current level and which enables the timer output when the current drawn by the current controller through the power input is less than the threshold current level.

11. The current controller of claim 10 wherein the current measurement circuit comprises:
    a sense resistance coupled in series between the power input and the variable impedance;
    a reference circuit biased by the power input; and
    a comparator, which compares a voltage drop across the sense resistance to a voltage drop across the reference circuit, wherein the comparator comprises positive feedback, which forms the latch, which has a latch output that is coupled to the timer for biasing the impedance control input and comprises a latch reset input coupled to the power control logic input, which is adapted to reset the latch without electrically decoupling the current controller from the source of energization and without decoupling the device from the current controller.

12. An inrush current controller for a device, comprising:
a host system interface comprising power and ground inputs and a power control logic input;
power and ground outputs for connecting to the device;
a variable impedance coupled between the power input and the power output and having an impedance control input, which controls the variable impedance between a high impedance, OFF state and a low impedance, ON state;
an inrush current limit circuit coupled to the power control logic input and providing an inrush limit output to the impedance control input, which biases the variable impedance between the ON and OFF states;
a resistance sensor, which is coupled to the power output and senses a resistance between the power output and the ground output, wherein the resistance sensor has a sensor output, which is coupled to the inrush current limit circuit and disables the inrush limit output to bias the variable impedance in the OFF state when the resistance is less than a threshold resistance, and wherein the sensor output enables the inrush limit output when the resistance exceeds the threshold resistance; and
a current measurement circuit comprising a latch, which biases the impedance control input such that the variable impedance is in the OFF state when current drawn by the current controller through the power input exceeds a threshold current level, wherein the latch comprises a reset input, which resets the latch and is connected to the host system interface for receiving the power control logic input.

13. The inrush current controller of claim 12 wherein the resistance sensor comprises a diode comprising an anode coupled to the inrush current limit circuit and a cathode coupled to the power output.

14. The inrush current controller of claim 12 wherein the host system interface comprises:
a connector for hot-plugging the device into a source of energization, the connector comprising the power and ground inputs and a power control logic input.

15. The inrush current controller of claim 14 and further comprising:
a timer coupled to the power input and providing a timer output to the impedance control input, which forces the variable impedance into the OFF state during a first time interval after hot-plugging, and wherein the inrush current limit circuit provides the inrush limit output to the impedance control input to enable a limited inrush of current through the variable impedance after the first time interval.

16. An inrush current controller for a device, comprising:
a host system interface comprising power and ground inputs, for connecting to a source of energization, and a power control logic input;
power and ground outputs for connecting to the device;
a variable impedance coupled between the power input and the power output and having an impedance control input, which controls the variable impedance between a high impedance, OFF state and a low impedance, ON state;

a timer coupled to the power input and providing a timer output to the impedance control input, which forces the variable impedance into the OFF state during a first time interval after connecting to the source of energization; and
a current measurement circuit, which measures current drawn by the inrush current controller through the power input and has a latch with a latch output coupled to the timer, which disables the timer output to bias the variable impedance into the OFF state when the current exceeds a threshold current level and which enables the timer output when the current is less than the threshold current level, wherein the latch further comprises a latch reset input coupled to the power control logic input, which is adapted to reset the latch without electrically decoupling the current controller from the source of energization and without decoupling the device from the current controller.

17. The inrush current controller of claim 16 wherein the current measurement circuit comprises:
a sense resistance coupled in series between the power input and the variable impedance;
a reference circuit biased by the power input; and
a comparator, which compares a voltage drop across the sense resistance to a voltage drop across the reference circuit, wherein the comparator comprises positive feedback, which forms the latch that is coupled to the timer for biasing the impedance control input.

18. The inrush current controller of claim 16 and further comprising:
a resistance sensor, which is coupled to the power output and senses a resistance between the power output and the ground output, wherein the resistance sensor has a sensor output, which biases the impedance control input such that the variable impedance in the OFF state when the resistance is less than a threshold resistance, and wherein the sensor output has substantially no effect on the impedance control input when the resistance exceeds the threshold resistance.

19. The inrush current controller of claim 16 wherein the host system interface comprises:
a connector for hot-plugging the device into the source of energization, the connector comprising the power and ground inputs and a power control logic input.

20. A current controller comprising:
an input connector for connecting into a source of energization, the input connector comprising power and ground inputs and a power control logic input;
a variable impedance coupled in series between the power input and a power output; and
a resistance sensor, which senses a resistance between the power output and an electrical ground and biases the variable impedance as a function of the resistance; and
a current measurement circuit comprising a latch, which biases the variable impedance as a function of current drawn by the current controller through the power input, wherein the latch comprises a latch reset input coupled to the power control logic input, which is adapted to reset the latch.

\* \* \* \* \*

UNITED STATES PATENT AND TRADEMARK OFFICE
CERTIFICATE OF CORRECTION

PATENT NO. : 7,609,499 B2
APPLICATION NO. : 11/122960
DATED : October 27, 2009
INVENTOR(S) : Hussein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twelfth Day of October, 2010

David J. Kappos
*Director of the United States Patent and Trademark Office*